United States Patent [19]

Jagannathan

[11] Patent Number: 4,778,719
[45] Date of Patent: Oct. 18, 1988

[54] PARTICULATE MAGNETIC RECORDING MEDIA AND METHOD OF MANUFACTURE THEREOF

[75] Inventor: Ramesh Jagannathan, San Diego, Calif.

[73] Assignee: Eastman Kodak Company, Rochester, N.Y.

[21] Appl. No.: 900,210

[22] Filed: Aug. 25, 1986

[51] Int. Cl.⁴ ................................................ G11B 5/70
[52] U.S. Cl. .................................. 428/323; 427/128; 428/694; 428/900
[58] Field of Search ............... 428/694, 900; 427/128, 427/131, 47, 48

[56] References Cited

U.S. PATENT DOCUMENTS

| | | | |
|---|---|---|---|
| 4,332,834 | 6/1982 | Takei | 427/128 |
| 4,333,961 | 6/1982 | Bruce et al. | 427/131 |
| 4,451,495 | 5/1984 | Homola et al. | 427/131 |
| 4,472,455 | 9/1984 | Kohl et al. | 427/128 |
| 4,578,280 | 3/1986 | Greiner et al. | 427/47 |
| 4,585,535 | 4/1986 | Sher et al. | 204/180.6 |

FOREIGN PATENT DOCUMENTS 2129841 3/1971 France .
2199155 9/1972 France .

*Primary Examiner*—Paul J. Thibodeau
*Attorney, Agent, or Firm*—Daniel Robbins

[57] ABSTRACT

A magnetic recording medium is fabricated by the electrodeposition of acicular magnetic particles onto an electrically conductive substrate from a mixture that is continuously dispersed and circulated through the electrodeposition vessel. Electrodeposition is effected at a critical electric field strength so that the particles are aligned in solution, and deposited perpendicular to the substrate surface such that the medium is highly densified. By use of anisotropic particles the resultant medium is adaptable for perpendicular recording, and by use of isotropic particles the resultant medium will support both longitudinal and perpendicular recording.

6 Claims, 7 Drawing Sheets

PARTICULATE MAGNETIC RECORDING MEDIA AND METHOD OF MANUFACTURE THEREOF

BACKGROUND OF THE INVENTION

1. Field of the Invention

This invention relates to magnetic recording media utilizing particulate magnetic material, and in particular to media having both increased concentrations of magnetic particles and a preferred particle orientation.

Figure 4:
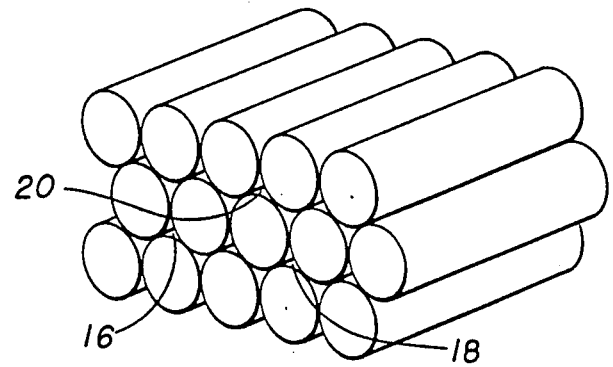
Figure 5:
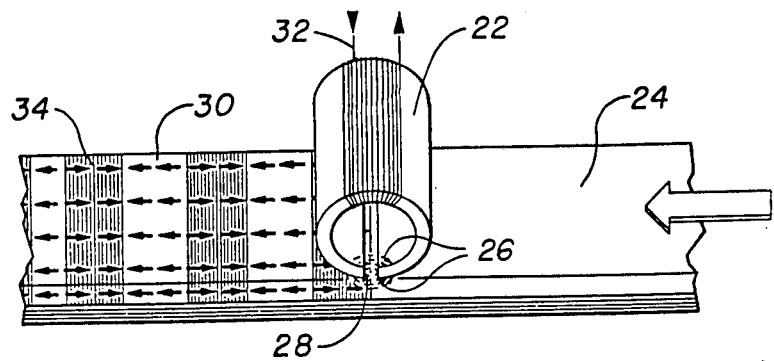
Figure 6:
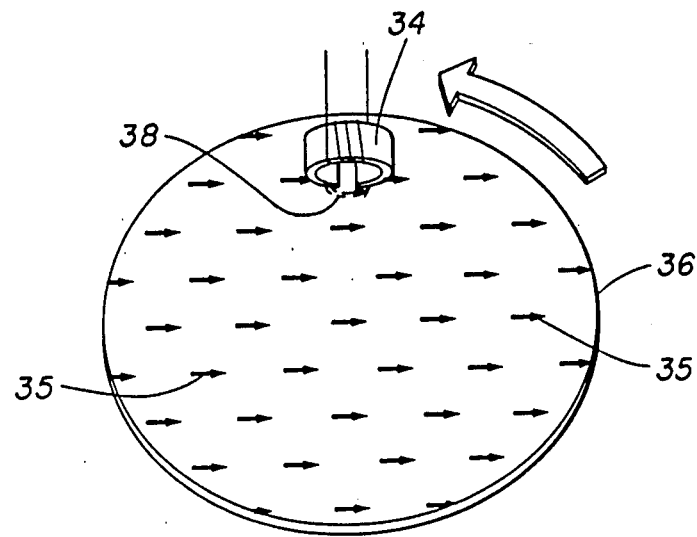
Figure 7:
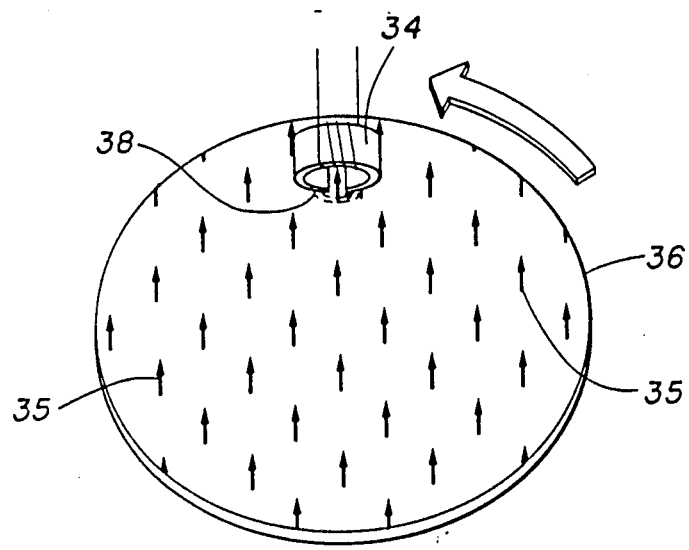
Figure 8:
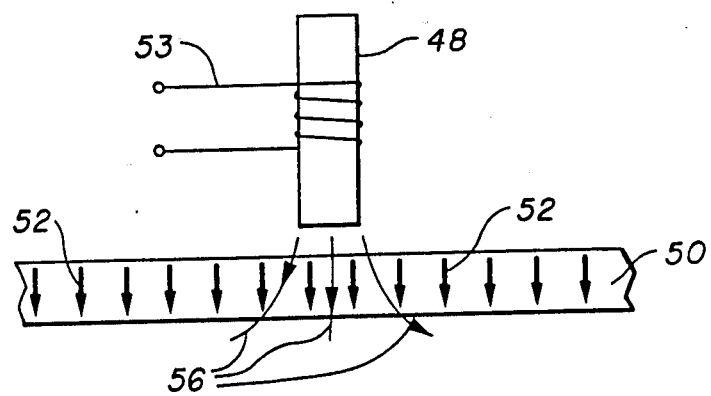
Figure 9A:
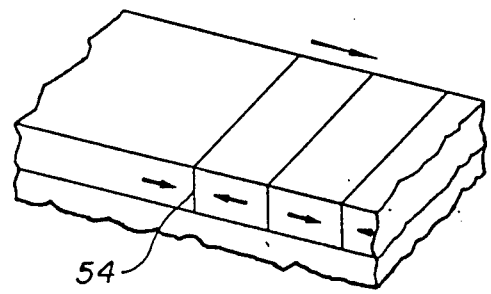
Figure 9B:
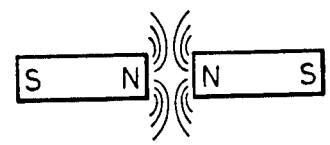
Figure 10A:
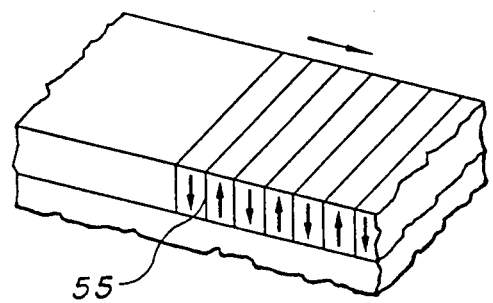
Figure 10B:
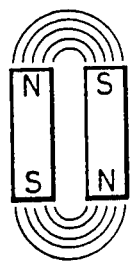
Figure 11:
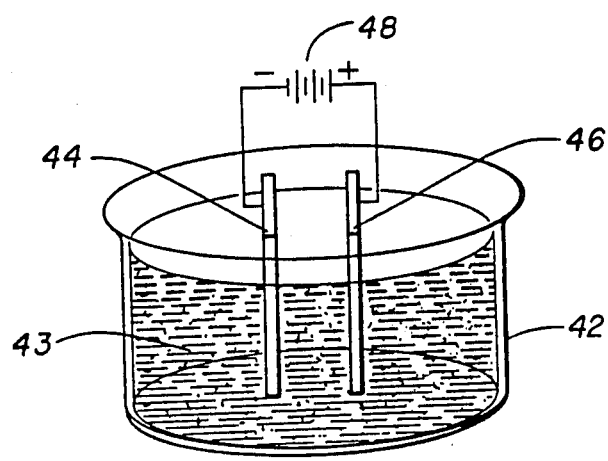
Figure 12:
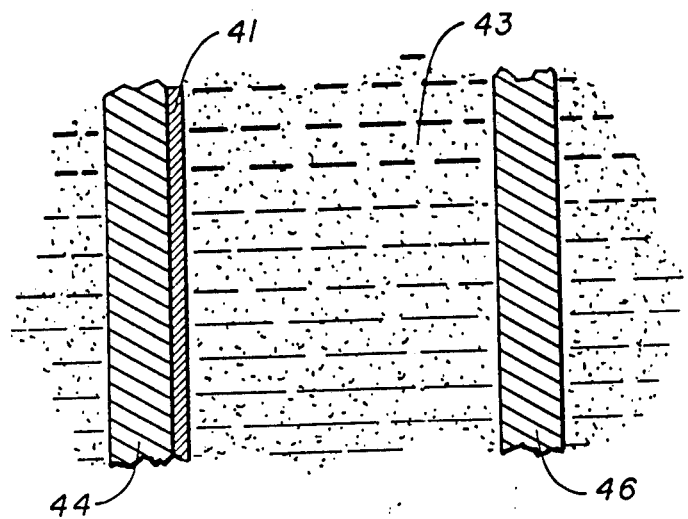
Figure 13:
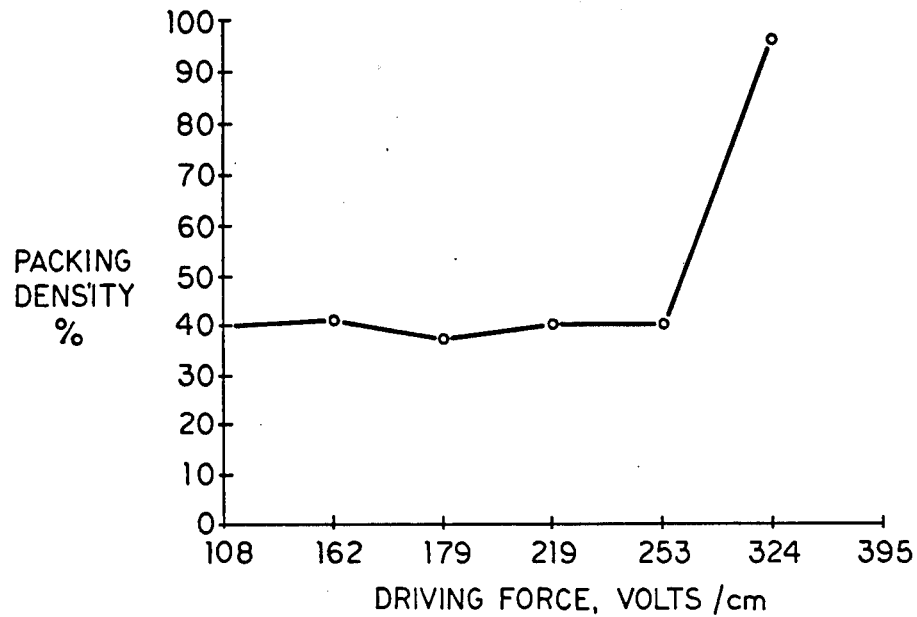
Figures 14A, 14B:
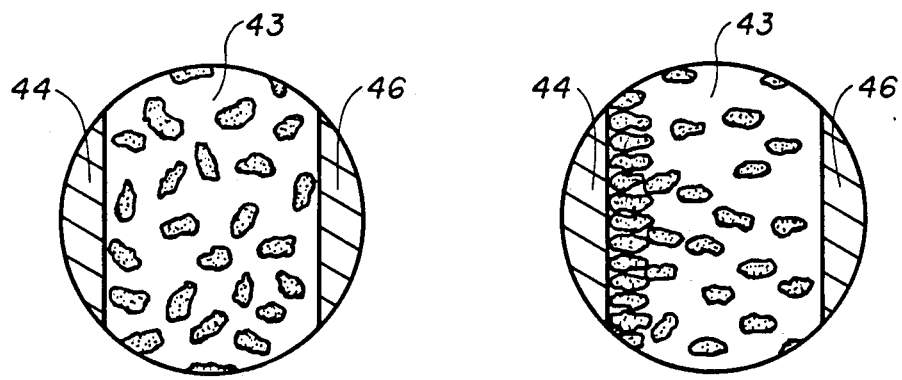
Figure 15:
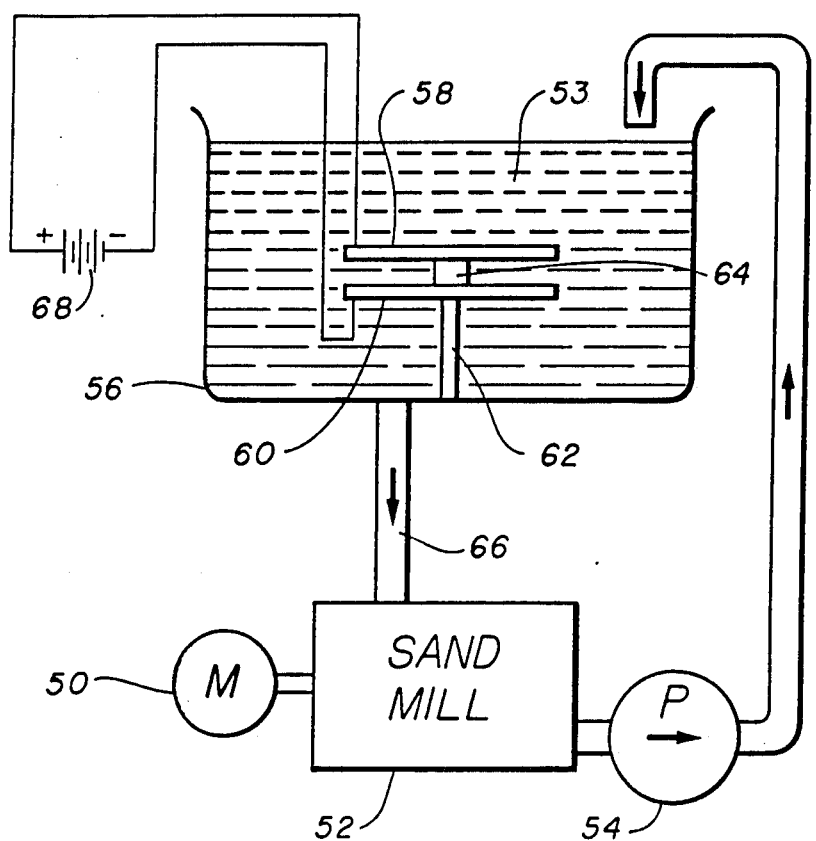

The invention, as well as the prior art, will be described with reference to the figures of which:

FIGS. 1, 2, 3, 4 are illustrations of geometrical concepts useful in understanding both the prior art and the invention, FIG. 5 is a schematic representation of longitudinal magnetic recording known in the prior art, FIGS. 6, 7 are schematic representations of longitudinal magnetic disk recording known in the prior art, FIG. 8 is an illustration of perpendicular magnetic recording known in the prior art, FIGS. 9a, 9b, 10a, 10b are illustrations useful in understanding one purpose of the invention, FIGS. 11, 12 are illustrations of the electrodeposition of magnetic coating according to the prior art, FIG. 13 is a graph useful in understanding the principle of the invention, FIGS. 14a, 14b are illustrations of particle alignment useful in understanding the invention, and FIG. 15 is a block diagram of electrodeposition apparatus according to the invention.

2. Description Relative to the Prior Art

Attention is initially directed to U.S. Pat. No. 4,578,280 issued Mar. 25, 1986 to Greiner et al, which discloses state of the art magnetic media useful for perpendicular magnetic recording, and to U.S. Pat. No. 4,585,535 issued Apr. 29, 1986 to Sher et al which discloses an electrophoretic method of producing magnetic recording media.

The continuing trend in digital magnetic recording is towards increased data density recorded on the magnetic medium. This requirement translates into both the recording of more tracks per inch and the recording of shorter signal wavelengths, resulting in higher areal data packing densities. Additionally, in modern digital recording, it is necessary that the media accommodate the capability to overwrite previously recorded data; that is, new data recorded over old data must effectively erase the previously recorded data. Overwrite is a complex phenomenon, but it is known in the art that the thinner the magnetic medium the more effective the overwriting of previously recorded long wavelengths by newly recorded short wavelengths. The data recording signals, based on the particular digital encoding method employed, generally have frequency components extending over several octaves. The overwrite (i.e. erase) capability must extend, therefore, over the entire frequency spectrum of the recorded signal. Inadequate erasure of the long wavelength signal results in a remanent long wavelength magnetization of the medium which interacts with the newly recorded signals causing unwanted pulse crowding and peak shift. A solution to this problem has been the reduction of the physical thickness of the recording medium with the goal of restricting the medium thickness of depths that can be adequately overwritten by a short wavelength signal. A price is paid, however, for this solution to the problem. The signal amplitude read from the medium during playback is proportional to the magnetization of the medium, which in turn is proportional to the total volume of magnetized material. By restricting the thickness of the magnetic coating the volume of magnetizable material is reduced, and the signal amplitude is degraded.

A variety of techniques have been employed in the prior art to address the volume of magnetizable material problem. In the production of media, the most common fabrication technique involves the coating of particulate magnetic material in suspension with a binder and solvent onto a substrate material. The solvent is driven off during a drying process and the medium is then compacted or "calendered" to increase the density of the magnetic layer. The final density attained is, to a large degree, dependent upon two factors: First, because the coating process involves the flow of the particle-binder-solvent mixture onto the substrate, rheological parameters controlling the dynamics of this flow establish the minimal amount of solvent needed for stable flow. When the solvent is driven off during drying, voids remain; the more solvent utilized, the greater the proportion of voids. While calendering reduces the effects of the voids, the calendering does not compact the material so as to completely eliminate the effects of the voids. Second, the geometric form of the particle itself sets a limit on the density which may be attained even if the compacting were 100 percent efficient in removing the voids. For example, considering a dispersion of identical spherical particles, the maximum packing fraction [the total volume of the spheres divided by the total volume of a cube enclosing them, expressed either as a decimal or percentage] has a theoretical maximum of 0.72. No amount of calendering can compact a medium consisting of identical spherical particles to a greater density.

Figure 1:
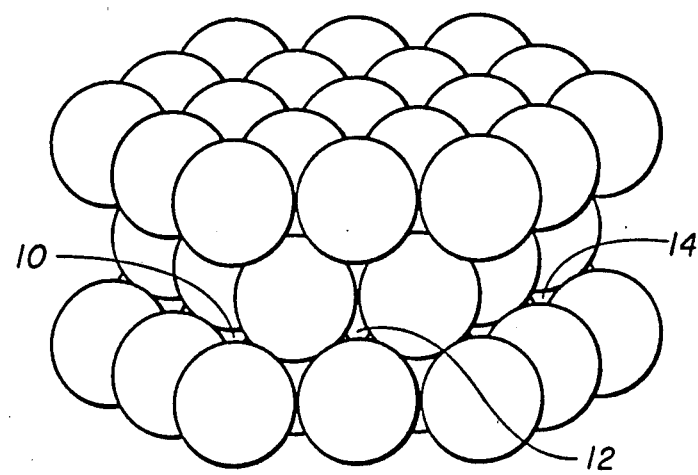
Figure 2:
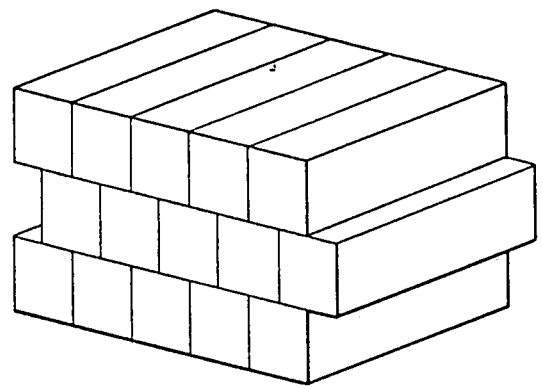
Figure 3:
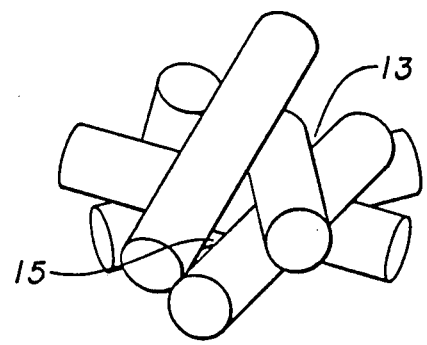

FIG. 1 shows the hexagonal close-packed structure of spherical particles, and the inevitable typical interstices 10, 12, 14 which give rise to the above mentioned packing fraction limitation of 0.72. Generally, magnetic recording particles are not spherical but are needle-like, or acicular, in shape. Such particles typically have aspect ratios, i.e. the ratio of the length of the major axis to that of a minor axis of the particle, ranging from two to seven. For simplicity, it is advantageous to consider acicular particles of ideal cross section, i.e. uniform cross sections which are either rectangles or circles for the entire length of the particle. Considering the ideal case of acicular particles having a rectangular cross section and aligned as shown in FIG. 2, the resultant structure has a packing fraction of 1.0. If particles of cylindrical cross section are randomly arranged in a coating, large interstices, 13, 15 [FIG. 3] will inevitably occur with attendantly reduced packing fraction. On the other hand, if such particles were perfectly aligned as shown in FIG. 4, they would have a packing fraction of 0.91 due to the typical interstices 16, 18, 20 arising from the circular cross sections. While actual particles approximate the aforementioned shapes, in reality, magnetic particles tend to be cigar-shaped and of irregular cross section. In practice, considerably lower packing fractions, of the order of 0.4, are realized in prior art fabrication of coated magnetic tapes and disks; the reasons being the presence of voids, the fact the particles are actually cigar-shaped, and the problem of not being able to completely align the particles.

It is desirable, at this point, to describe briefly the technique known in the art for measuring the packing fraction of particulate magnetic madia. The saturation magnetization of a known volume of the magnetic medium is measured by means of a vibrating sample magnetometer. The saturation magnetization is directly proportional to the volume of magnetizable material in the sample; the greater the volume of megnetizable particles relative to the volume of binder or voids (such as those due to particle misalignment), the higher the measured saturation magnetization. Data is also available in the art for the "intrinsic" saturation magnetization values for the magnetic material under consideration; that is, the saturation magnetization of the material, not in particle form, but as a continuous atomic crystalline structure. This may be visualized as a homogeneous bar of the basic magnetic material; it is the most dense configuration in which the given magnetic material could exist. The ratio of the saturation magnetization per unit volume of the sample to the intrinsic saturation magnetization of the material is defined as the packing fraction of the particulate medium, and it will be appreciated that the packing fraction is a definitive measure of the density of recordable material present in the medium.

The desirability of alignment of acicular particles in the medium relates both to the resultant increased density of particles, and also to the parameters of the recording process itself. Magnetic particles exhibit "shape anisotropy," that is, the preference for particle magnetization to occur along a particular geometric dimension of the particle. An acicular particle generally sustains magnetization along the particle's long or major axis, and therefore the particle's orientation directly impacts the effectiveness of the recording process. The relation between particle orientation and the recording process may be appreciated by consideration of the most common technique of recording . . . longitudinal recording. In FIG. 5, longitudinal recording is performed by a recording head 22 which is in contact with a moving magnetic medium 24. A magnetic field 26, generated at the gap 28 of the head 22, is applied longitudinally with respect to the medium 24. The field 26 magnetizes the particles in the medium 24 in the direction of the field with a resultant remanent magnetization 30 in the medium. When current in the winding 32 of the head 22 reverses direction, the field 26 reverses as does the direction of magnetization 34 in the medium. In view of the previously described particle recording characteristic, the fabrication of magnetic media for use in longitudinal recording mandates that all the acicular particles lie essentially parallel to the direction of the longitudinal field. It will be appreciated this also conforms to the geometric requirement for increasing the density of magnetic material in the coating by improving the packing fraction. To accomplish this during tape manufacturing a magnetic field is applied to the coating to align the particles before the coating is dried. [Jorgensen, F., "The Complete Handbook of Magnetic Recording", Blue Ridge Summit, Pa.: Tab Books, 1980, p. 38]. Under the action of the field, the acicular particles rotate against the resisting couple due to the viscosity of the binder-solvent mixture until their major axes are aligned with the direction of the applied field. Even with the application of magnetic fields, however, the packing fractions attained are approximately only one half the theoretical values due to the appreciable viscosity of the coating mixtures, and the voids and deviations from ideal particle shapes previously described.

In the manufacture of magnetic webs for the fabrication of magnetic floppy disks, the goal of increased packing density is further limited by the shape anisotropy of the typical acicular particle. It will be appreciated that if the above described procedure was followed in fabrication a web of magnetic material for disk application, the resultant disk would have all the particles aligned in one direction. Such a disk, 36, for use in longitudinal digital recording is illustrated in FIG. 6. The arrows 35 show the direction of alignment of the major axes of the particles, which, as previously stated, is also the preferred direction of magnetization due to shape anisotropy. The longitudinally oriented recording field 38 of a record/playback head 34 operating on the disk 36, would sometimes be aligned with the particles' major axes, [FIG. 6], and one quarter of a disk rotational cycle later [FIG. 7] would be oriented perpendicular to the particles' major axes. The result is a continually varying orientation between the head field direction and the particle axes as the disk rotates. This produces a variation in magnetization, causing a "twice around" variation in the amplitude and phase of the recorded playback signal. To avoid the particle alignment responsible for this unwanted signal modulation, the particles are subjected to an intense a.c. magnetic field as they are coated onto the web substrate. This field randomizes the directions of the axes of the particles and obviates the "twice around" problem. The penalty, however, is that the disk has a relatively low packing fraction due to the resultant random orientation of the particles, and attendantly, the density and available signal are reduced. The relative magnetic moment in the desired direction is also only about half that of the aligned particle value, further reducing the signal.

It is to be noted that the previous discussion of longitudinal recording and its associated media specifies that the recording field is parallel to the plane of the medium and that the particles are aligned in the plane of the medium. In the magnetic recording art, an area of intense current interest is that of "perpendicular" recording where, by way of contrast, the recording field is perpendicular to the plane of the medium. Perpendicular recording is illustrated in FIG. 8, where a single pole head 48 is positioned above a medium 50 having the ability to support magnetization in a direction perpendicular to the plane of the medium 50. Current through the winding 53 of the head 48 generates a magnetic field 56 which penetrates the medium 50 perpendicular to its plane and magnetizes the medium 50 in the field direction. The remanent magnetization 52 is thus perpendicular to the plane of the medium. In the prior art, particulate perpendicular recording media has generally not been available, and perpendicular recording has been restricted to such practices as those using cobalt-chromium alloys sputtered onto a substrate. It is known that such alloys exhibit vertical anisotropy, and current perpendicular recording has been virtually confined to the use of such alloys. The recognized problem of providing a "particulate medium for perpendicular recording" is referred to by White, Robert M. (Editor), "Introduction to Magnetic Recording", New York, N.Y.; IEEE Press, 1985, p. 69 wherein it is stated:

S. Iwasaki of Tohoku University has suggested that data might be stored perpendicular to the plane of the disk. Here the end of the core of a head, and confronts the disk and throws field lines deep into the magnetic medium. As a result the data are stored, so to speak, on end. More than 100,000 magnetic reversals per inch might be possible, but the implementation awaits the development of both the head and the medium for it. By the technique described above the magnetic dipoles of iron oxide can be oriented in the plane of the disk. The problem is to find a way in which such dipoles can be oriented perpendicular to the plane of the disk.

As will appear below, the present invention teaches how to so orient the particles and, unlike the processes disclosed in U.S. Pat. Nos. 4,578,280 and 4,585,535, does not require an auxiliary magnetic field to align the particles perpendicular to the substrate.

The impetus to the application of perpendicular recording may be appreciated by reference to FIGS. 9a, 9b, 10a, 10b. FIG. 9a illustrates a longitudinally recorded transition 54. When a transition from one magnetic orientation to another occurs, the longitudinally aligned recorded cells interact in the manner of small bar magnets as illustrated in FIG. 9b. In this orientation, the bar magnets tend to demagnetize each other because each magnet's field bucks that of the other. The demagnetization effect is more pronounced for short magnets, or equivalently, in a recorded medium, for short recorded wavelengths [Jorgensen, supra p. 52]. On the other hand, in perpendicular recording, as illustrated in FIG. 10a, the fields of adjacent recorded transitions 55 interact in the manner of bar magnets as shown in FIG. 10b. In this case the fields of the bar magnets aid rather than oppose each other. For this reason perpendicular recording is of great interest in short wavelength recording technology where the demagnetizing effect present in longitudinal recording is most manifest. Currently available longitudinal recording systems attain a recording density of approximately 10,000 flux reversals per inch, while it is anticipated, as previously mentioned, that by use of perpendicular recording more than 100,000 flux reversals per inch may be possible.

In addition to the previously described web coating process, it is also known in the prior art to produce magnetic coatings by electrodeposition. This technique is an application of the method utilizing the phenomenon of "electrophoresis" which is exploited in the broad field of electropainting. Electropainting has been applied to a wide variety of painting requirements, from coating the insides of metal cans to painting automobile bodies. [Yeates, R. L. "Electropainting" Teddington, Great Britain: Robert Draper, Ltd., 1966]. In Japanese Patent Publication Number 25321/1977 entitled "Electrodeposition Paint for Magnetic Recording", a mixture of magnetic particles in a water soluble acyrilic polycarbonate resin emulsified uniformly in water is described for use in the electrodeposition of a mgnetic coating.

The Japanese technique is illustrated in FIG. 11. A vessel 42 contains a mixture 43 of solvent, binder and magnetic particles. A cathode 44 and an anode 46 are immersed in the mixture 43, and a d.c. voltage source 48 is connected between the cathode 44 and the anode 46. Each particle tends to acquire an electric charge due to the interface between the particle and the binder-solvent solution. A diffuse layer of charge then surrounds the charged particle, so that the combination of charged particle and the diffuse layer is electrically neutral. The particle moves under the electric force due to the field between the cathode and anode, and the diffuse layer tends to move with the particle to which it is attached but, at the same time, the diffuse layer is electrically attracted to the other electrode. As the particle moves, new charge builds in front of the particle in the direction of motion, and the diffuse layer dissipates in the opposite direction. [Bockris, J. M., and Reddy, A. K. N. "Modern Electrochemistry", New York: Plenum Press, 1974, Vol. 2, p. 833]. In the previously referenced Japanese Patent Publication, the electric field magnitude is indicated to be approximately 17 volts/cm.: a field sufficient to move the magnetic particles to the electrode where they deposit as a magnetic coating 41 [FIG. 12].

SUMMARY OF THE INVENTION

In the electrodeposition of acicular particles to form a magnetic coating, rather than use of an electric field of just sufficient strength to deposit the particles on the substrate, the invention teaches the use of a field strength of sufficient magnitude to also align the particles with the field. It has been discovered that in increasing the field strength, a point is reached which is dramatically characterized by a rapid and significant increase of density of the electrodeposited medium. This field strength is defined as the "critical field strength", and the resultant medium, characteristic of deposition at this field strength, has a volumetric packing fraction greater than 0.5, and typically one on the order of 0.9. Expanding on this point, it is hypothesized that at the critical field strength, the electrical field not only drives the particles to the electrode on which they deposit, but also rotates the particles so that their major axes are in the direction of the electric field. This rotation occurs because the field exerts a torque on the charged particles proportional to the angle between the major axes and the field direction. The field, which is akin to that associated with a parallel plate capacitor, is essentially uniform between the electrodes. Because the directions of the electric field lines are always perpendicular to the conductive electrode surface, the particles are deposited on the electrode, which is also the medium substrate, with the particles' major axes perpendicular to the electrode and aligned parallel to each other. The graph of FIG. 13 illustrates the discovered dependence of packing fraction for acicular particles as a function of electric field strength. It will be appreciated that there is a broad span of lower value field strengths where the field is of insufficient magnitude to completely align the particles against the couple exerted by the viscose medium, and at these lower field strengths the particles arrive at the cathode with somewhat random orientations. As previously hypothesized, when the particles are completely aligned with the field the increase in coating density occurs; if the particles are only partially aligned they will still randomly pile up on the cathode [FIG. 14a]. In the present implementation of the invention, the graph of FIG. 13 indicates that it is not until the field reaches the critical strength of approximately 325 volts/cm that complete particle alignment [FIG. 14b], with an attendant increased packing fraction, abruptly occurs.

The alignment of the major axes in the coating provides, as previously expained, a highly densified magnetic layer. By control of the deposition time a thin but dense magnetic layer with desirable overwrite characteristics for digital recording is obtained. It will be seen that, unlike coatings earlier described where the major axes of the particles lie essentially parallel to the plane of the substrate, in the electrodeposited coating obtained by following the teachings of the invention, the major axes are aligned perpendicular to the substrate.

Recalling that the direction of preferred magnetization for an anisotropic particle is along the particle major axis, it will be appreciated that such an electrodeposited layer using anisotropic particles is advantageously suitable for perpendicular recording.

The teaching of the invention may also be applied to the fabrication of a magnetic coating useful not only for perpendicular recording but also suitable for longitudinal recording as well, the resultant longitudinal recording occurring even though the major axes of the acicular particles are perpendicular to the direction of the longitudinal recording field lines. To implement such a coating, cobalt doped acicular particles, of the type described in French Pat. No. 2,129,841 and French Pat. No. 2,199,155, are deposited on a substrate in accordance with the teachings of the present invention. Such doped acicular particles have the property of supporting magnetization not only along their major axes but along their minor axes as well. This embodiment of the invention may therefore be applied to provide an improved solution to the "twice around" problem of longitudinal disk recording previously described. A magnetic disk fabricated from such isotropic particles in accordance with the teachings of the invention will comprise a highly dense recording surface of parallel acicular particles oriented perpendicular to the disk substrate. The thickness of the magnetic coating may be concurrently controlled to provide optimum overwrite characteristics. Because these particles are isotropic, the medium will support longitudinal recording as well as perpendicular recording, and since the particles are magnetizable in the directions of the minor axes for all rotational positions of the disk, the "twice around" effect is eliminated.

DESCRIPTION OF THE INVENTION

The practice of the invention may be further understood by reference to FIG. 15. A motor 50 drives a "sand mill" 52 of a type well known in the art, i.e. the "Mini Motor Mill" manufactured by Eiger Machinery Corp., Chicago, Ill. Small glass beads are employed in the continuously operating sand mill 52 to finely disperse a mixture 53 of solvent, binder, magnetic particles and additive which, for example, are employed in the following percentages by weight:

Cyclohexanone as solvent: 80.5%
Magnetic particles: 16.1
Polyurethane as binder: 2.3
Surfactant: 1.1

The surfactant is a complex phosphate ester free acid of the type manufactured by GAF Corp., Wayne, N.J., under the trade name "Gafac R.E. 610". This surfactant is an anionic surfactant which not only enhances the amount of charge present on the magnetic particle, but also controls the sign of the charge. In the present embodiment the particles are charged positively. A cationic surfactant would change the sign of the charge, with the result of depositing the magnetic coating not on the cathode but on the anode. The polyurethane binder is available under the trade name "Nippolan" from Nippon Urethane Co. Ltd., Japan.

The mixture is pumped from the sand mill 52 by means of a pump 54 into a vessel 56 in which the electrodeposition takes place. Within the vessel 56, a disk anode 58 and an equi-area disk cathode 60 (the latter serving as the substrate for the magnetic coating), are mounted on a nonconductive standoff 62 with a nonconductive spacer 64 separating the anode 58 and the cathode 60. The spacer 64 provides a separation of 1.33 cm and is located at the central area of the cathode 60; an area which requires no magnetic coating because it is not addressed during recording. The mixture flow is continuous, and the mixture 53 returns to the sand mill 52 by means of a return line 66. A d.c. voltage source 68 of approximately 432 volts is connected between the anode 58 and cathode 60 to effect the electrodeposition to a field intensity of approximately 325 volts/cm. The current flow in the mixture is derived primarily from the ionic double layer previously described, and the mixture has a high specific resistance in the range of from $10^6$–$10^9$ ohm-cm. As a result, the current is limited by the resistance of the mixture; the mixture being substantially higher resistance than the coating being deposited, and deposition continues at constant current even as the coating builds up on the cathode. The deposition time is approximately 5 secs., providing a coating of approximately 10 microns thick. The coated cathode 60 is then rinsed, oven dried to drive off any adherent solvent, and the resultant surface is the magnetic medium configured as a disk.

Unlike the teachings of U.S. Pat. Nos. 4,578,280 and 4,585,535, wherein the particle alignment is accomplished by external magnetic fields applied when the particles are already captive on the substrate, and when they are essentially encapsulated in a semi-solidified binder, the present invention teaches aligning the particles while they are still mobile in solution and depositing them on the substrate in an aligned condition by means of the same electric field that performs the alignment. As a result of the "in-fluid" alignment of particles, media made pursuant to the invention is characterized—and may be so identified—by:

(1) Packing fractions as high as 0.9 are attained by alignment in solution, and
(2) The deposited medium is of uniform packing density throughout its entire volume, having been desposited from a uniform homogeneous solution of aligned particles.

ADDITIONAL EXAMPLES FOR THE PRACTICE OF THE INVENTION

1. Solvent: tetrahydrofuran, (THF), a readily available organic solvent.
   Binder: Desolite 2764-70-130 acrylate, available from De Soto Corp., Des Plaines, Ill.
   Surfactant: Emcol CC55, quarternary ammonium acetate, available from Witco Chemical Co., New York, N.Y.
2. Solvent: Acetone, a readily available organic solvent.
   Binder: Nippolan, polyurethane, available from Nippon Urethane Industry Co. Ltd., Japan.
   Surfactant: Emcol CC55, quarternary ammonium acetate, available from Witco Chemical Co., New York, N.Y.
3. Solvent: Methylisobutylketone (MIBK), a readily available organic solvent.
   Binder: DeSolite 2764-70-130 acrylate, available from De Soto Corp., Des Plaines, Ill.
   Surfactant: Gafac R.E. 610, phosphate ester free acid, available from the GAF Corp., Wayne, N.J.
4. Solvent: Methylethylketone (MEK), a readily available organic solvent.

Binder: Nippolan, polyurethane, available from Nippon Urethane Industry Co. Ltd., Japan.

Surfactant: Gafac R.E. 610, phosphate ester free acid, available from GAF Corp., Wayne, N.J.

Ratios for the respective above indicated mixtures may be selected within a wide variety of individual combinations, each of which is associated with a respective critical voltage.

The invention has been described in detail with particular reference to preferred embodiments thereof, but it will be understood that variations and modifications can be effected within the spirit and scope of the invention. For example, the cathode disk upon which the medium is electrodeposited may be replaced with a continously moving flexible web having a conductive surface partially immersed in the mixture, and the anode disk may be replaced by a surface opposed to the web so that a controlled electric field exists between the web and the anode. A coating may be continually electrodeposited, followed by appropriate rinsing and drying procedures. In this embodiment of the invention, magnetic media in the form of magnetic tape is fabricated by the electrodeposition technique of the invention.

What is claimed is:

1. A magnetic recording medium comprising:
   a. a substrate having at least one electrically conductive bonding surface,
   b. at least one layer of acicular magnetic particles disposed relative to said surface, wherein the major axes of said acicular particles are essentially perpendicular to said surface, and
   c. binder means affixing said particles to said substrate surface, the packing fraction of said medium being between greater than 0.5, and about 0.9 said packing fraction being essentially uniform throughout said medium.

2. The medium of claim 1 wherein said acicular particles are magnetically anisotropic, with the preferred magnetization direction of said particles being essentially in the directions of said major axes.

3. The medium of claim 1 wherein said acicular particles are magnetically isotropic, with said particles supporting magnetization along both major and the minor axes of said particles.

4. A magnetic recording medium comprising:
   a. a magnetic recording layer comprising acicular magnetic particles embedded in a polymeric binder, said particles having their major axes oriented essentially parallel to each other and essentially perpendicular to the plane of said layer, said layer having a packing fraction greater than 0.5, and said packing fraction being essentially uniform throughout said layer, and
   b. a substrate having an electrically conductive surface to which said magnetic recording layer is bound.

5. The medium of claim 4 configured as a disk, wherein the particles of said recording layer are primarily disposed for perpendicular recording.

6. The medium of claim 4 configured as a disk, wherein the particles of said recording layer are supportive of both perpendicular and longitudinal recording.

* * * * *